(No Model.)
J. C. WALKER.
THILL COUPLING.
No. 547,570. Patented Oct. 8, 1895.
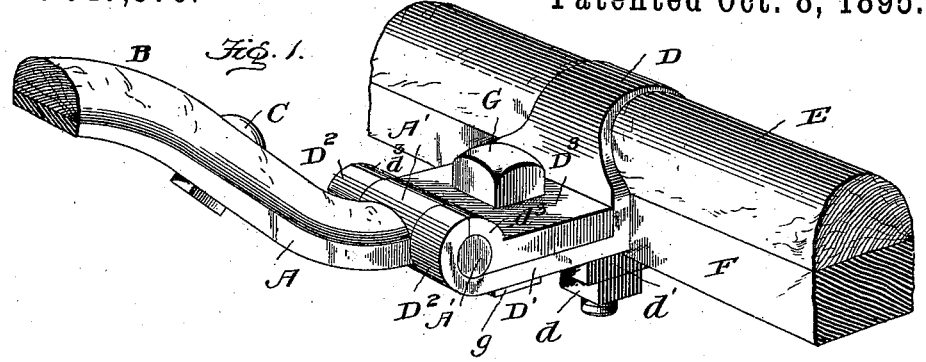
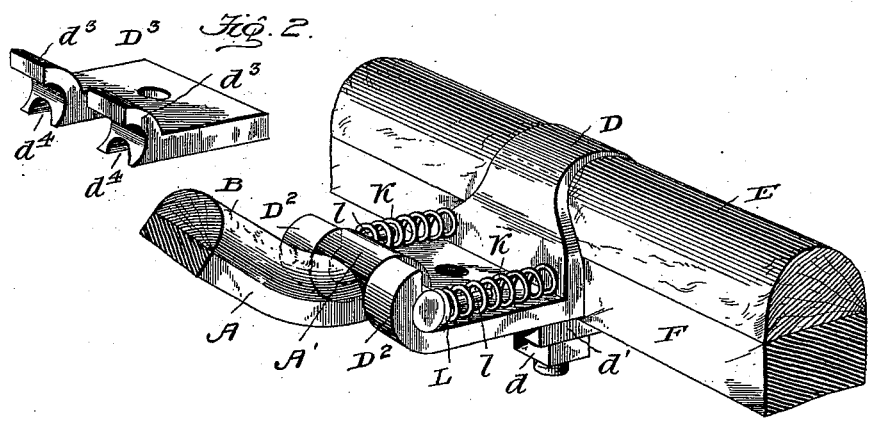
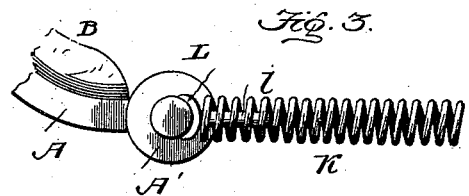
Witnesses
James C. Walker
Inventor
By A. H. Evans & Co
Attys.

UNITED STATES PATENT OFFICE.

JAMES C. WALKER, OF ALPENA, MICHIGAN.

THILL-COUPLING.

SPECIFICATION forming part of Letters Patent No. 547,570, dated October 8, 1895.

Application filed March 1, 1895. Serial No. 540,096. (No model.)

*To all whom it may concern:*

Be it known that I, JAMES C. WALKER, a citizen of the United States, residing at Alpena, in the county of Alpena and State of Michigan, have invented certain new and useful Improvements in Thill-Couplings, of which the following specification contains a full, clear, and exact description, reference being had to the accompanying drawings, in which—

Figure 1 is a perspective of the coupling. Fig. 2 is a similar view with the cap removed, and Fig. 3 shows certain details.

The invention relates to that class of thill-couplings known as "antirattlers."

The object of the invention is to provide a coupling of this class in which the "antirattling devices are fully covered and protected from snow, ice, and dirt, and in which the parts are few and simple in construction and readily separated for repair, &c.

A represents the thill-iron provided with a cylindrical cross-head A' at its rear end and secured to the thill B in the usual manner by the bolt C.

D represents the clip which fits over the bolster E and axle F and is secured in place in the usual manner by the nuts $d$ and the plate $d'$, which rests against the lower side of the axle. The front side of the clip D is formed or provided with a forwardly-projecting lug D', provided at its rearward end with a pair of upwardly-curved half-bearings $D^2$, between which extends the shank of the thill-iron A, while the cross-head A' thereof rests against the inner concave faces of the half-bearings $D^2$.

$D^3$ is a cover or cap which rests upon the upper side of the lug D' and is formed at its forward end with two half boxes or bearings $d^3$, which register within the bearings $D^2$ and hold the thill-iron in place.

G is a bolt extending through aligned apertures in the lug D' and cover or cap $D^3$ and provided at its lower end with a nut $g$, the aperture in the lug D' being screw-threaded and the nut therefore acting as a lock-nut. The lower face of the cap or cover $D^3$ is formed with two parallel grooves $d^4$, which extend from the bearings $d^3$ to the rear end of the cap, and in these grooves are placed spiral or other springs K K, the rear ends of which bear against the front face of the clip D, while the forward ends of the springs receive the stems $l$ of the concave followers or antirattlers L, and the springs press these followers against the rear side of the cross-head A' with sufficient force to hold its forward side in contact with the bearings $D^2$ and thus take up wear and prevent rattling. The springs and followers may be renewed when necessary by simply removing the cap or cover $D^3$, and the thill-iron may be removed in the same way.

Having thus described my invention, what I claim, and desire to secure by Letters Patent, is—

1. In a thill coupling, the axle clip provided on its forward side with a lug having a pair of half bearings to receive the head of the thill iron, a cover or cap resting on the upper face of the lug and also having half bearings registering with those of the lug; longitudinal grooves or channels being formed between the adjacent faces of said lug and its cover or cap, springs within said grooves or channels, to engage the head of the thill-iron, and means for securing the cover or cap to the lug, substantially as set forth.

2. In a thill coupling, the axle clip formed with a forwardly projecting lug having a pair of upwardly extending half bearings at its front end to receive the head of a thill iron, a cover or cap resting on the upper face of the lug, provided at its outer end with half bearings registering with those of the lug and formed in its lower face with grooves extending from said half bearings to its rear end, spiral or other springs mounted in said grooves with their rear ends resting against the clip, followers at the forward ends of the springs and pressed thereby against the rear end of the thill iron, and means for securing the cap or cover to the lug, substantially as set forth.

JAMES C. WALKER.

Witnesses:
M. N. BEDFORD,
JAMES DEVEREAUX.